United States Patent [19]
Stewart

[11] 3,979,887
[45] Sept. 14, 1976

[54] SPIRAL LAWN MOWERS

[76] Inventor: Ralph T. Stewart, 2042 Queen St., Winston-Salem, N.C. 27103

[22] Filed: Mar. 7, 1975

[21] Appl. No.: 556,316

[52] U.S. Cl. .............................. 56/13.5; 56/17.5; 56/249; 241/236
[51] Int. Cl.² ........................................ A01D 55/20
[58] Field of Search ............ 56/294, 249, 251, 13.6, 56/13.5, 17.5, 17.2; 241/236

[56] References Cited
UNITED STATES PATENTS

| | | | |
|---|---|---|---|
| 2,434,707 | 1/1948 | Marshall | 241/236 X |
| 3,633,831 | 1/1972 | Dodson | 241/236 X |

Primary Examiner—J.N. Eskovitz

[57] ABSTRACT

A lawn mower with two coacting spirals cooperating in a scissors-like manner. This mower is self-sharpening and self-cleaning since a torsional stress urges the coacting spirals together. At least one spiral cutter is mounted on a resilient torsion disc.

3 Claims, 7 Drawing Figures

SPIRAL LAWN MOWERS

SUMMARY OF INVENTION AND PRIOR ART

One of the principal objects of my invention is that of making a mower that is safer for the average homeowner, and one that will not pick up objects and hurl them. Other objects of this invention are: Making of a mower that will cut smoother lawns, which is done by shearing the material rather that sever by impact which operation often leaves ragged lawns. And too, the shearing type mower takes less power, and operates quieter.

Second to safety in the mower, is its feature of self-sharpening, and self-cleaning of the spiral blades of the cutters, while in operation. Another object of this invention is that its spiral coacting principles enables the mower to cut while going both forward or backward, and retains the quality of cutting as reel types with cutter-bars, or ledger-plates, cannot do, and they are as stated, easily damaged on outer circumferences by rocks and other hard objects. Due to the departure from all forms of impact cutting which does not always produce smooth lawns, I employ the rotation of opposed, overlapping, spiral blades, 23, and 29, to make a scissors-like shearing operation during rotation.

It is known that in the prior art of spiral cutting that some attempts have been made with spiral cutters, with manual means to take up wear, one spiral blade revolving with another and both spirals wound conically. Several have been attempted with one spiral coacting with saw-toothed straigt blades, etc. However there is none known to be on the market.

There are successful applications of spiral cutting principle in that of cutting meats, as in sausage grinders, and in plastics, as in U.S. Pat. No. 2,434,707 for grinding plastic materials continuously, and U.S. Pat. No. 3,633,831, which employs a series of spiral cutters to granulate sheet plastics, rubber, etc.

Neither of these however, would have any bearing on uses for lawn mowers, as they could not be adapted to this type machines.

Having stated several of the objects of my invention, together with the prior art, I will now refer to the accompanying drawings and briefly describe the figures.

This mower can operate well with only one resiliently mounted set of blades on one cutter only, though both cutters having resiliently mounted sets of blades might give a bit more range to the correction for irregularities in the spiral blades, 23, and 29.

Figure 1:
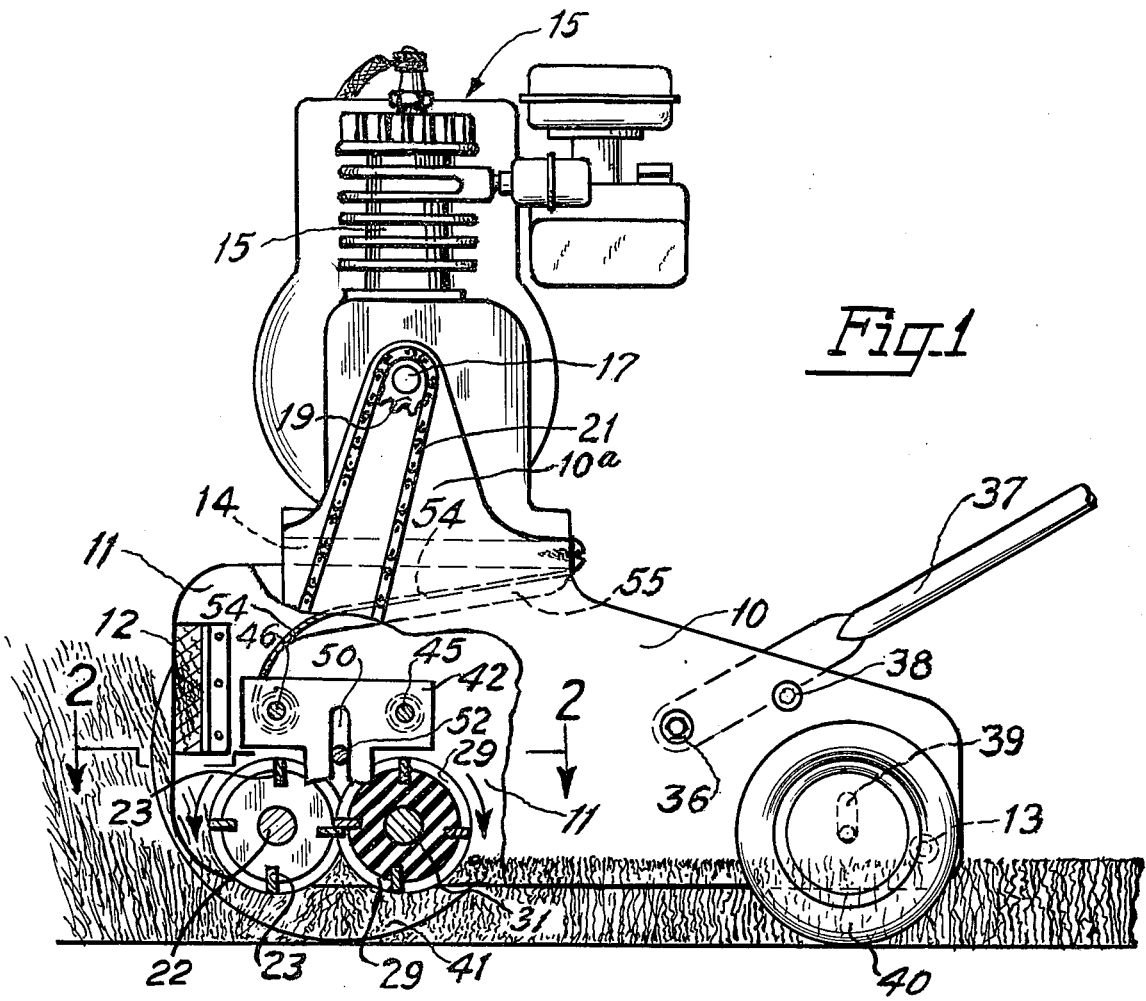
FIG. 1, shows a side elevation of my mower.
Figure 3:
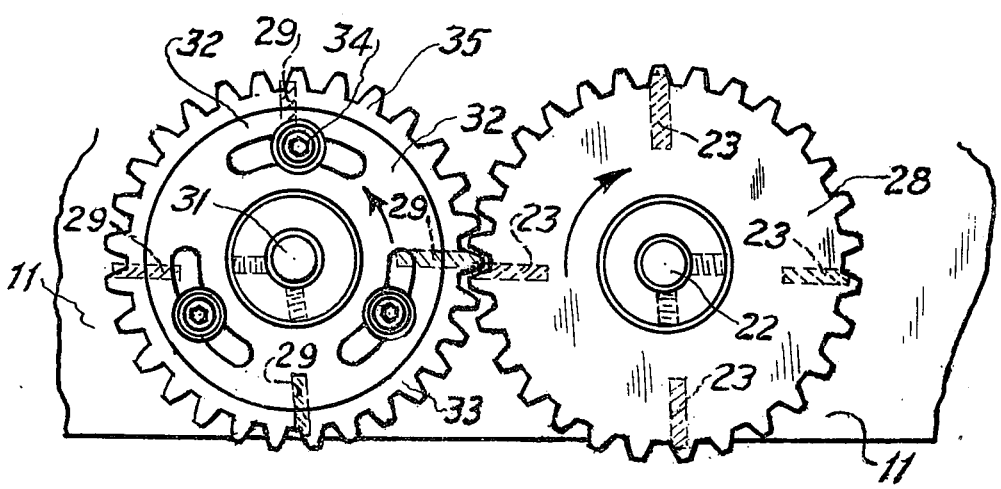
FIG. 3, shows a view taken from line, 3—3 in FIG. 2 (As viewed from far side of mower).

I will now describe my mower with fully detailed description of parts and their functions, by numeral references to the accompanying drawings: I will let numeral, 10, represent the sideplate nearest the eye, and 11, represent the far side-plate. (See FIG. 1). A tie-piece, 12, secures the side-plates, 10, and 11, at the front of mower, and a girt, 13, secures them at rear. A horizontal plate, 14, serves to support the engine, 15, which is mounted thereon, and has an extension shaft, 17, which is supported by a bearing, not shown, which is secured in the upright extension, 10a of side-plate, 10. A drive sprocket, 19, is secured to shaft, 17, and drives sprocket, 20, by the roller chain, 21. Sprocket, 20, is secured to front cuttershaft, 22, and has an approximate, 2:1 ratio with the sprocket, 19.

Figure 6:
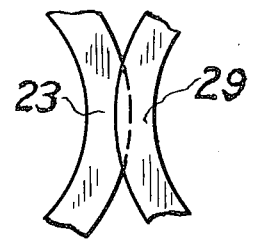
FIG. 6, shows a fragmentary portion of of one the overlapping spiral shearing arrangements with coacting blades, 23, and 29, as viewed at a position from line, 6—6, in FIGS. 4 and 5.
Figure 5:
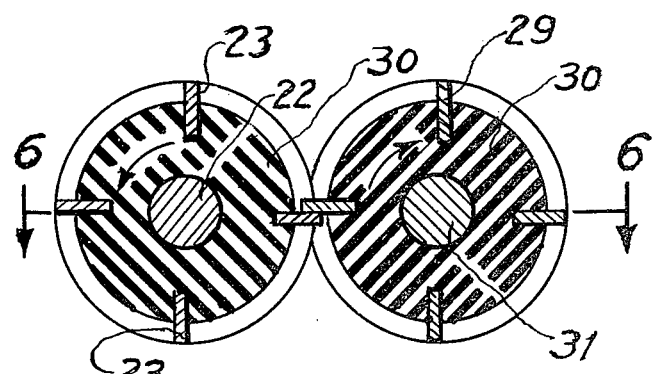
FIG. 5, shows both cutters mounted in resilient material.
Figure 7:
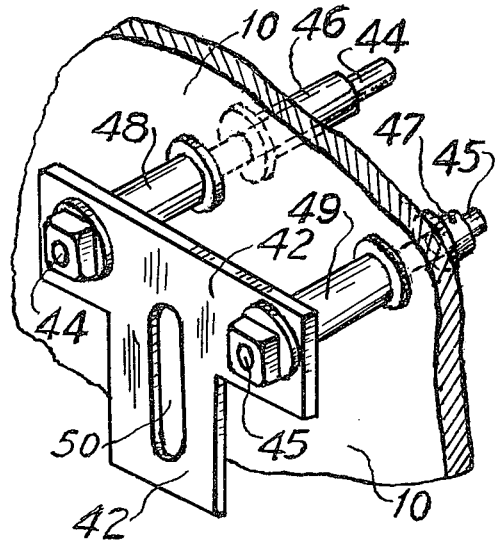
FIG. 7, shows an isometric view of one of the front wheel brackets, and associated parts.

The front cutter shaft has bearings, 24, and 25, which are fitted in flanged cups, 26, and, 27, which cups are pressed into the side-plates, 10, and 11, respectively. The front cutter as described, has blades, 23, which coact opposed spiral blades, 29, which blades, 29, overlap the blades, 23, (See FIG. 6).

The rear cutter shaft rotates in bearings, 1, and 2, which have cups, 3, and 4, which cups are likewise pressed into the sideplates, 10, and, 11, respectively. I show a girt, 36, onto which is loosely mounted a conventional handle, 37, which rests on studs, 38.

Figure 2:
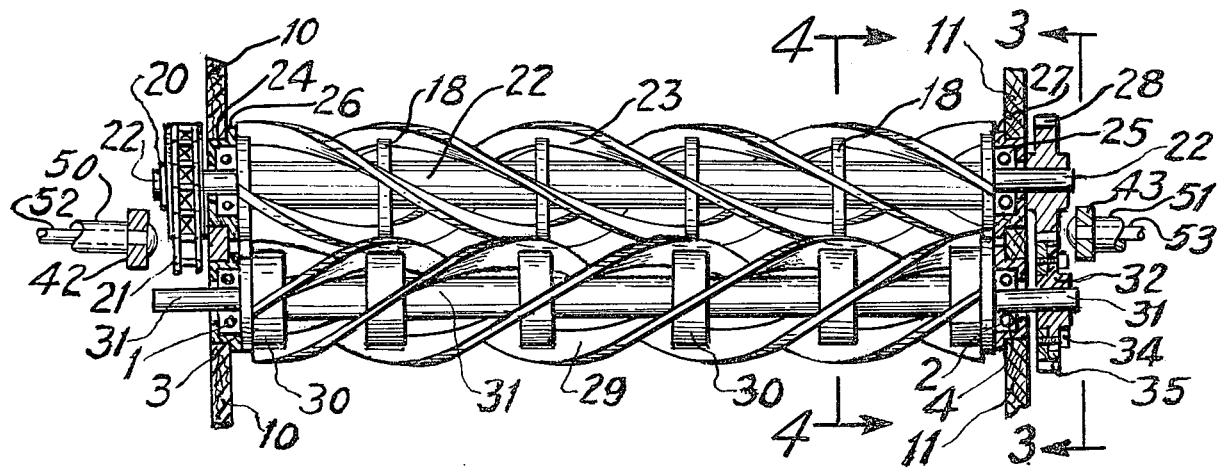
FIG. 2, shows a plan view as taken along the line, 2—2 in FIG. 1, (showing driven sprocket, cutters, and torsion device).
Figure 4:
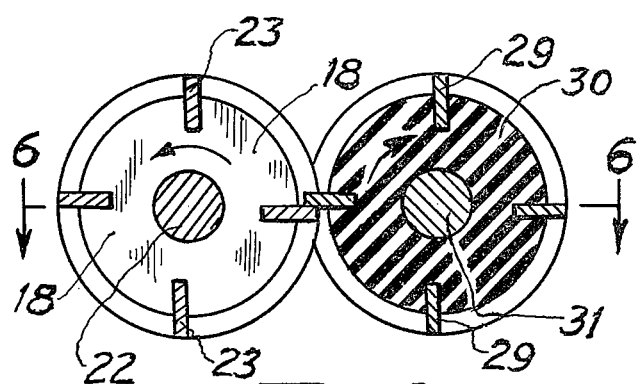
FIG. 4, shows a view taken along the line, 4—4 in FIG. 2.

Slots, 39, in side-plates, 10, and 11, serve for height adjustment for rear of mower. The slots, 50, and 51, in front wheel brackets, 42, and 43, serve for height adjustment of cutters. (See FIG. 2, and isometric view FIG. 4.). The brackets, 42, and 43, are held by bolts, 44, and 45. These bolts have inside tubular girts over them, and outside tubular spacers, 46, 47, 48, and 49, which space the brackets 42, and 43, respectively, and the side-plates, brackets etc. are held tight by the bolts when properly run up with conventional nuts.

A deflector plate, 54, with a series of bafflles, 55, direct the clippings to the rear of mower and distributes them evenly, preventing slugging and windrowing of the clippings. I show the body of my mower as being plywood, however it can easily be converted into steel stampings, or aluminum castings, by any competent manufacturer.

The resilient mounting of the cutter blades, 23, and 29, for this mower, together with dynamic balancing, (which is a well known practice for cylindrical work), will produce a quieter mower, especially with its lower speeds, and lesser power. A gear, 28, is secured to the shaft, 22, and meshes with the gear, 35, on the the torsion device, which will be fully described later in the Method of Operation.

The resilient discs, 30, are bonded to the blades, 29, of rear cutter, and to its shaft, 31. The metal disc, 32, is secured to shaft, 31, and has slots, 33, which receive screws, 34, which screws are provided with conventional flat washers. The screws, 34, are threaded into the gear, 35, and when the proper torsional stress is set on the resilient material, 30, the screws, 34, are tightened to clamp the disc, 32, to gear, 35, to hold the initial torsion as required for the blades, 23, and 29, to operate properly, regardless of varying speeds of the said blades in rotation.

METHOD OF OPERATION

To set the required tension on the resilient mountings, 30, of cutter blades, 29, the gear, 28, is held against rotation while the shaft, 31, is partly rotated to stress the torsion in the resilient discs, 30, to urge the blades, 23, and 29, together firmly, so that all overlaps of said blades will have no openings which are caused by irregularly formed spirals, and when firm pressure is sure to be made at each overlap, with the mating opposed spiral windings of said blades, the screws, 34, are tightened to hold the initial torsional stress, regardless of the different speeds of rotation.

The proper torsional setting will insure proper contact at every overlap as cutters revolve, throughout the entire length of the cutters, 23, and 29, and will clean and sharpen the cutting blades while in use, and the blades will last indefinitely. The winding action of the spirals throws the taller grass sidewise and draws it through the cutters, chopping it into short lengths, and leaves no long standing grass, or cut pieces on the lawns.

Having explained my mower by detailed description and setting forth its method of operation, I will now claim its specific merits in which:

1. A lawn mower comprising a pair of horizontally and parallel, rotatably mounted, power driven, overlapping, coacting spiral cutters, one of said cutters having its blades mounted rigidly on its respective shaft, and the second of said coacting cutters having its blades mounted on resilient bonded material, said material also bonded to its respective shaft, spirals of the said second cutter being wound opposite to those of the first, rigid cutter, the said pair of cutters overlapping to form shearing action, as the respective blades of each of said cutters coact to sever the material, torsional means for adjusting and setting torsion on the resilient discs, said torsion means for urging the said spiral cutters together regardless of errors or inaccuracies in the curvature of the said spirals.

2. A lawn mower comprising a pair of horizontally and parallel, rotatably mounted, power driven, overlapping, coacting spiral cutters, both of said cutters being mounted on resilient material, said material bonded to the respective shafts and spiral blades, one of said spiral cutters having blades right hand and one having blades left hand, each of said cutters overlapped near their outer peripheries for coacting in a shearing action as they are rotated, means for torsionally stressing the said material, and urging the said blades together, so that the material will be sheared regardless of the imperfections in the peripheries of the said spiral blades.

3. A lawn mower including a body with a handle and height-adjustable wheels connected to said body, the improvement comprising a pair of parallel, horizontally-aligned, cylindrical, spiral cutters rotatively mounted within said body, power means for driving said cutters, in both overlapping and coacting relationship, said cutters having opposite direction spirals, combined resilient and torsion means for urging said spirals together when said spirals are rotated.

* * * * *